United States Patent [19]

Tsai

[11] Patent Number: 5,982,735
[45] Date of Patent: Nov. 9, 1999

[54] TILT ANGLE ADJUSTABLE MECHANISM FOR COMPACT DISC RECORDING/ REPRODUCING DEVICE

[75] Inventor: Ching-Shiang Tsai, Taipei, Taiwan

[73] Assignee: Industrial Technology Research Institute, Hsinchu, Taiwan

[21] Appl. No.: 08/998,680

[22] Filed: Dec. 29, 1997

[51] Int. Cl.[6] ............................. G11B 17/30; G11B 17/00
[52] U.S. Cl. ............................................ 369/219; 369/249
[58] Field of Search .................................. 369/215, 219, 369/244, 249; 360/105, 106

[56] References Cited

U.S. PATENT DOCUMENTS

| | | | |
|---|---|---|---|
| 5,615,204 | 3/1997 | Watanabe et al. | 369/219 |
| 5,687,159 | 11/1997 | Kim | 369/219 |
| 5,761,182 | 6/1998 | Jeon | 369/219 |
| 5,764,618 | 6/1998 | Kim | 369/219 |
| 5,768,248 | 6/1998 | Lee | 369/219 |

*Primary Examiner*—Allen T. Cao
*Attorney, Agent, or Firm*—W. Wayne Liauh

[57] ABSTRACT

An adjustment mechanism for use in a compact disc recording/reproducing device, which operates with a laser beam of a laser incident on a disc, the adjustment mechanism comprising: a base; a pick-up head, carrying the laser; a first guiding rod and a second guiding rod, guiding a movement of the pick-up head, being parallel to each other and forming a plane with an orientation with respect to the disc that determines the angle of incidence of the laser beam; and at least three supports, extending upward from the base, each holding one end of the first and second guiding rods. Each of the at least three supports comprises a main body, mounted on the base, a spring, pressing from below on the supported end, and an adjusting screw, mounted in a threaded vertical hole in the main body, leaning on the supported end from above, such that the supported end has a well-defined vertical position, which is adjusted by turning the adjusting screw. By adjusting the at least three supports, the orientation of the plane is adjusted to ensure a proper angle of incidence of the laser beam, so as to avoid reading errors.

2 Claims, 8 Drawing Sheets

TILT ANGLE ADJUSTABLE MECHANISM FOR COMPACT DISC RECORDING/ REPRODUCING DEVICE

BACKGROUND OF THE INVENTION

1. Field of the Invention

The present invention relates to an adjustment mechanism adjusting the tilt angle in a compact disc recording/reproducing device, particularly to an adjustment mechanism for use in a compact disc recording/reproducing device of high precision for data of high density.

2. Description of Related Art

On a disc, signals are stored in units that are either 0 or 1. The signals are read by measuring the intensity of a laser beam reflected on a reflective layer on the disc and by subsequent decoding.

A conventional optical reading system for a disc is shown in FIGS. 9 and 10. A pick-up head 1 is sliding along a guiding rod 2 and a guiding rail 3, which are mounted on a base 4. A motor 5 drives the pick-up head along the guiding rod 3, so as to scan the disc and read data. The disc is set on a turntable 6, which is driven by a spindle motor.

As shown in FIGS. 10–12, the guiding rail 3 and the base 4 are made by injection die casting. The guiding rod 2 has two ends, which are laid into accommodating parts 7 and 8, respectively, one end being fixed to a metal plate 9A by a screw 9. Due to production and assembly defects, the positions of the ends 7,8 and the guiding rail 3 are often different from the design, causing the angle of incidence of the laser beam on the disc, which is defined as tilt angle, to deviate from the intended value, as well. Reading errors result. This problem becomes more severe, as the data density on CDs increases.

SUMMARY OF THE INVENTION

An object of the present invention is to provide an adjustment mechanism for the tilt angle in a disc recording/reproducing device, which has a height adjustable guiding bar for carrying the pick-up head, so as to adjust the Tilt Angle, such that reading errors due to production defects are avoided.

Another object of the present invention is to provide an adjustment mechanism for the tilt angle in a compact disc recording/reproducing device with inexpensive structural elements, which are easy to produce and assemble.

The present invention can be more fully understood by reference to the following description and accompanying drawings.

DETAILED DESCRIPTION OF THE PREFERRED EMBODIMENTS

Figure 1:
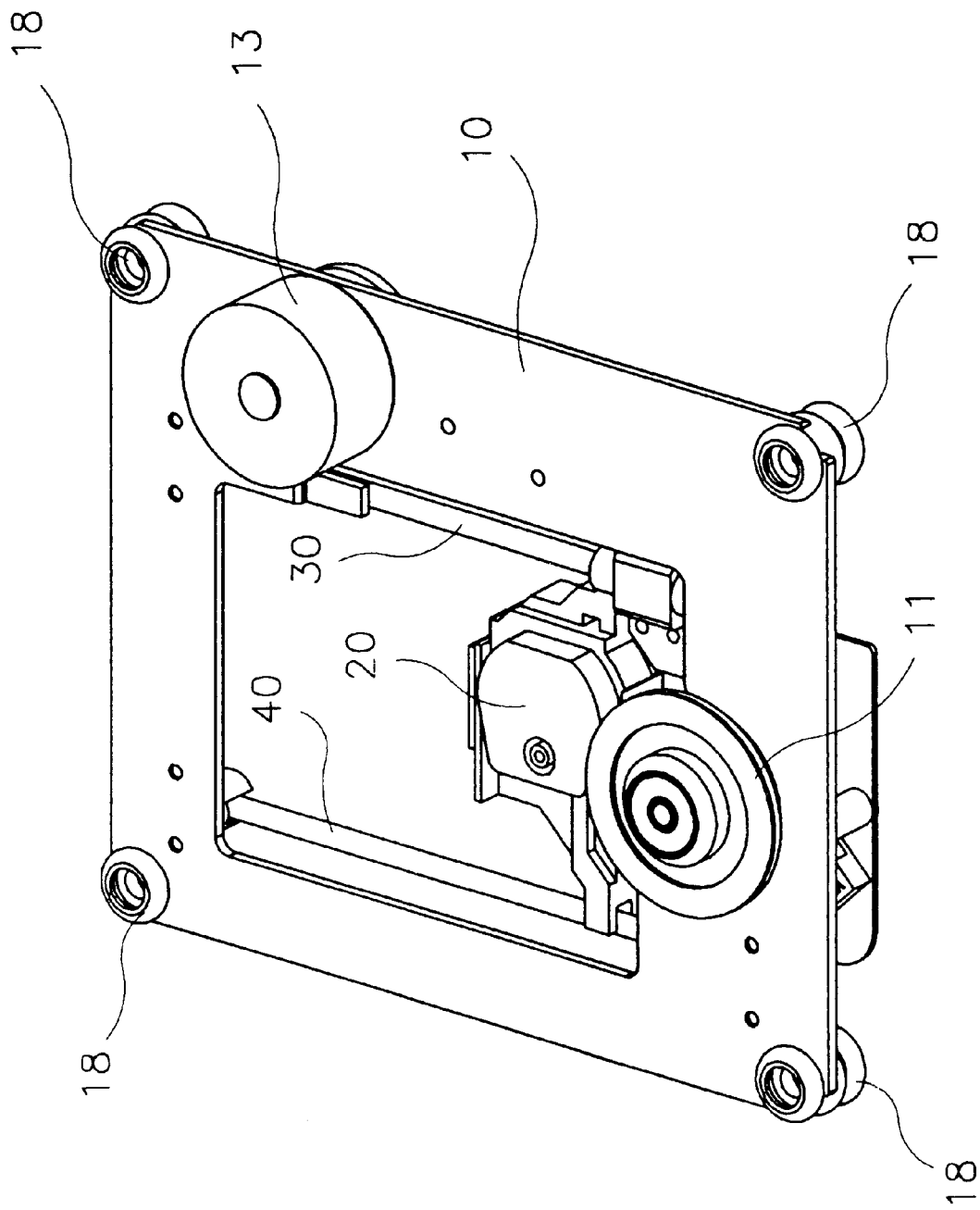
FIG. 1 is a perspective view of the present invention.
Figure 2:
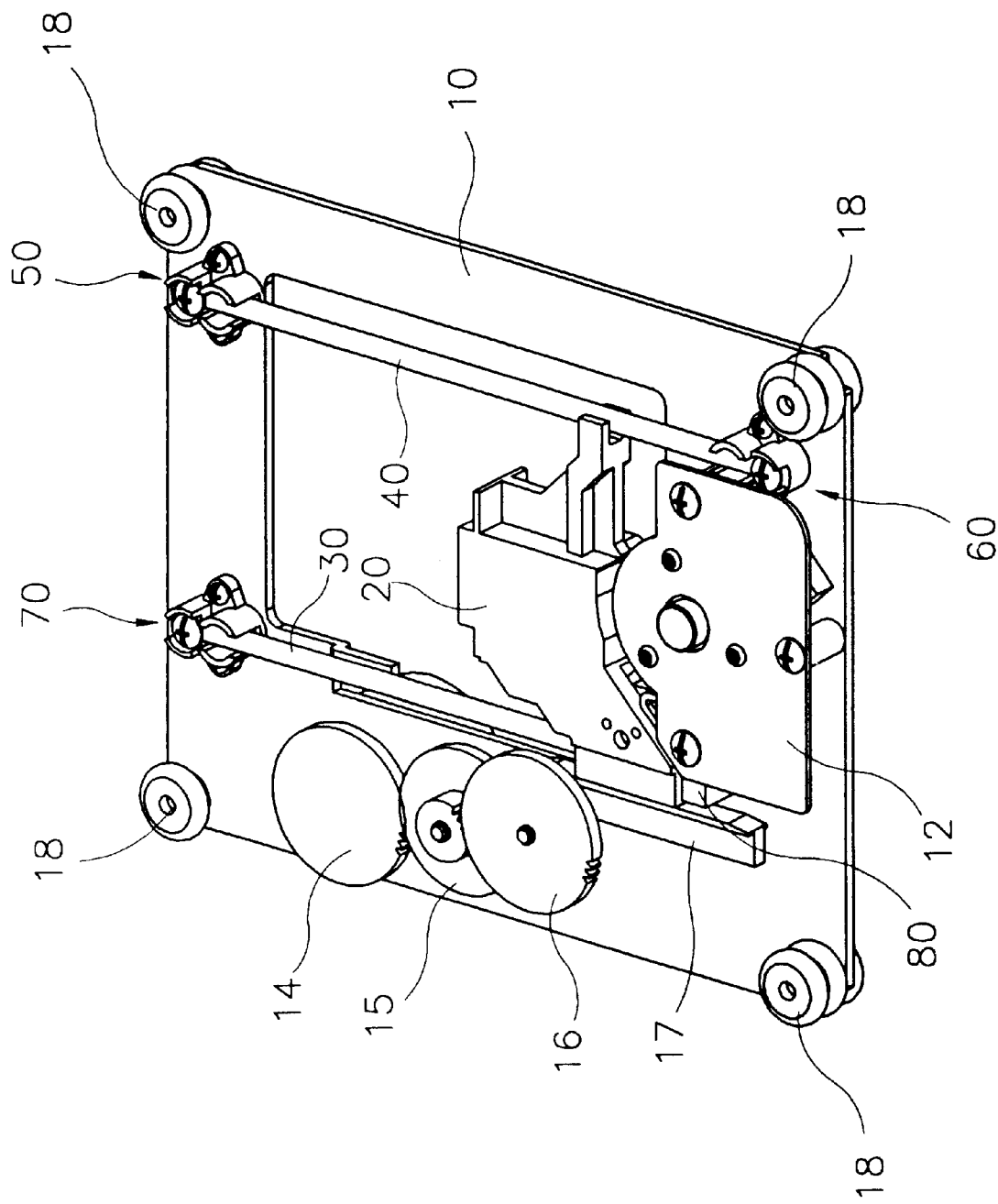
FIG. 2 is a perspective view of the present invention, as seen from behind.

As shown in FIG. 1 and 2, the adjustment mechanism for the tilt angle in a compact disc recording/reproducing device of the present invention mainly comprises: a base 10; a pick-up head 20; a first guiding rod 30, mounted on the base 10; and a second guiding rod 40, mounted on the base 10.

The first and second guiding rods 30, 40 are parallel to each other, guiding a radial movement of the pick-up head over a disc (not shown), for recording on or reproducing from the disc. The disc is set on a turntable 11, which is rotated by a spindle motor.

Another motor 13 is mounted on the base 10. The motor 13 drives via cogwheels 14, 15, 16 a linear movement of a rack 17, which is attached to the pick-up head 20, being parallel to the guiding rods 30, 40. Thus the motor 13 drives the pick-up head 20 along the guiding rods 30, 40.

Several shock-absorbing elements 18 are attached to the base 10 for protecting the pick-up head 20 and the disc from mechanical shocks.

The second guiding rod 40 has two ends, which are respectively accommodated in supports 50, 60. The heights of the supports 50, 60, defined as the distances to the base 10, are adjustable. The first guiding rod 30 has two ends, at least one of which is accommodated in a height-adjustable support 70. The other end of the first guiding rod, if not height-adjustable, is fixed to a fixed support 80. The supports 50, 60, 70, 80 are mounted on the base 10.

Below, the height-adjustable supports 50, 60, 70 are explained, taking the support 50 as an example.

Figure 3:
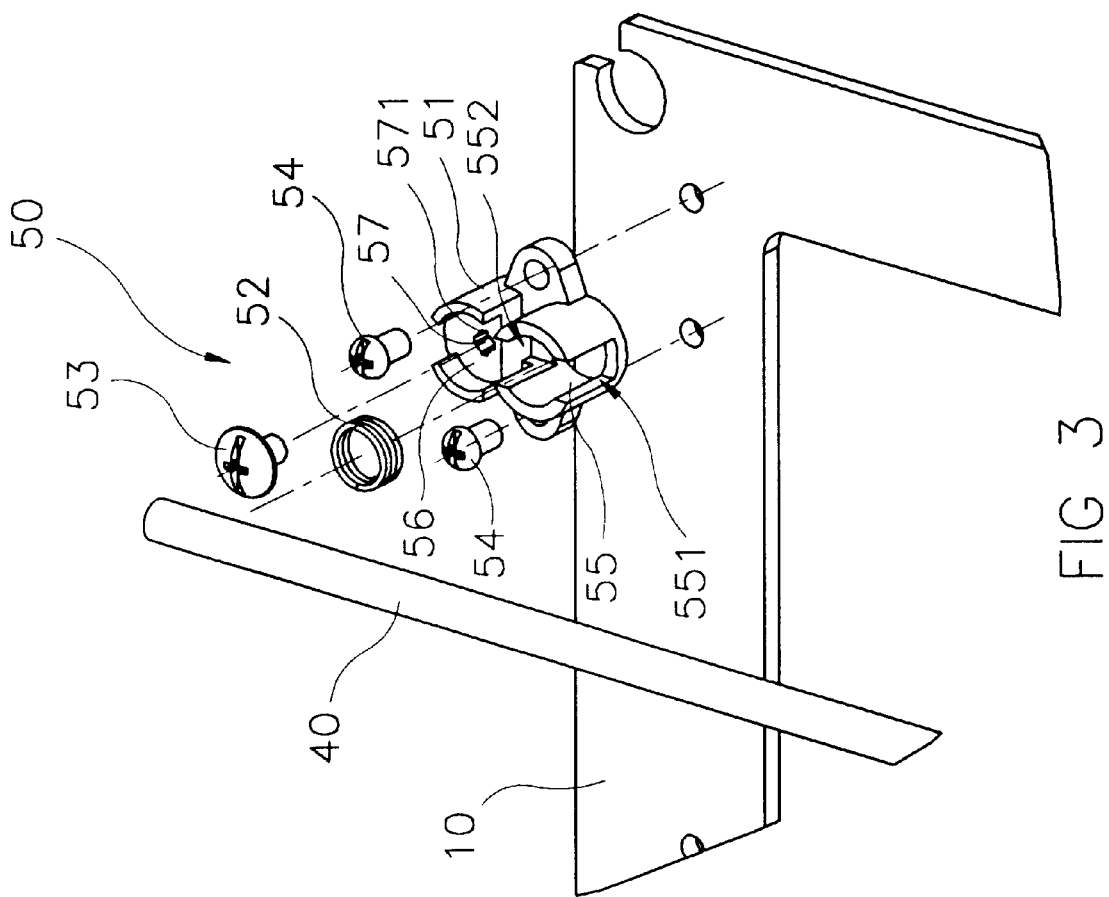
FIG. 3 is a perspective exploded view of the guiding rod support of the present invention.
Figure 4:
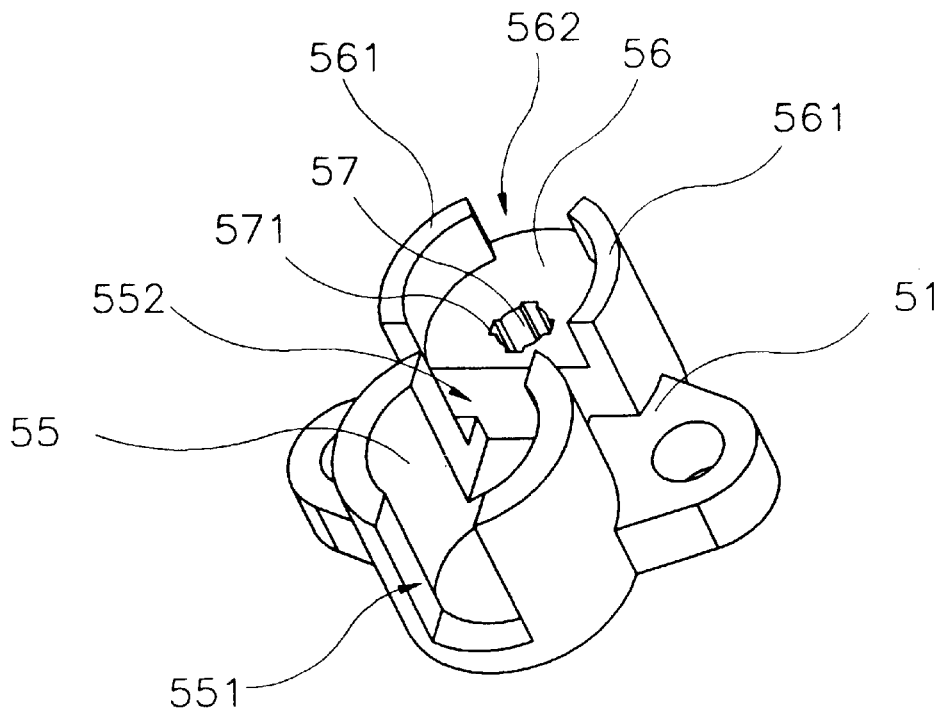
FIG. 4 is a perspective view of the main body of the guiding rod support.
Figure 5:
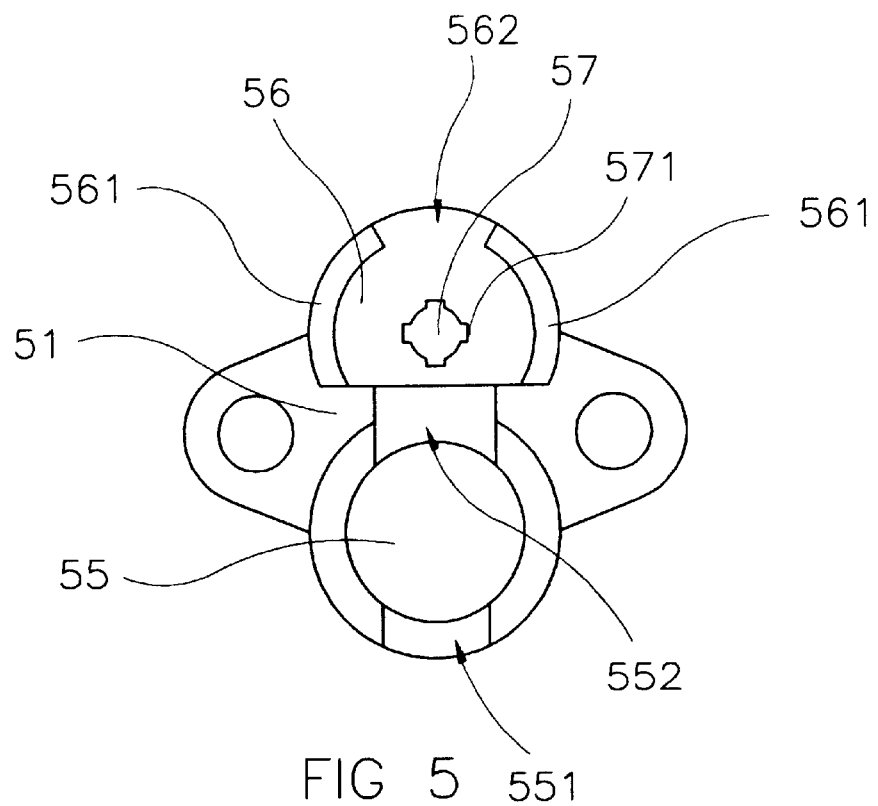
FIG. 5 is a plan view of the main body of the guiding rod support.

Referring to FIG. 3, the support 50 comprises a main body 51, a spring 52, and an adjusting screw 53. Holding screws 54 fix the main body 51 to the base 10. As shown in FIG. 4, the main body 50 has a cylindrical front half 55, which forms an accommodating space with a front opening 551 and a rear opening 552. The spring 52 is laid into the accommodating space of the front half 55. The second guiding rod 40 is put through the front and rear openings 551, 552. The rear opening 552 is wider than the diameter of the second guiding rod 40, while the front opening 551 just fits the diameter of the second guiding rod 40. The main body 50 also has a rear half 56, serving as a base for the adjusting screw 53, with a vertical hole 57. The screw 53 has a wide head with a flat lower surface 531. The hole 57 has several longitudinal grooves 571 for taking in glue, as explained farther below. The rear half 56 further has two cylindrically curved side walls 561, surrounding the head of the adjusting screw 53. An opening 562 between the side walls 561 takes in glue.

For mounting the second guiding rod 40 in the support 50, the support 50 is first fixed on the base 10. The spring 52 is laid into the accommodating space of the front half 55. One end of the second guiding rod 40 is put through the front opening 551, pressing down on the spring 52. Finally the adjusting screw 53 is screwed into the hole 57 with jigs, and the height of the second guiding rod is adjusted.

Figure 6:
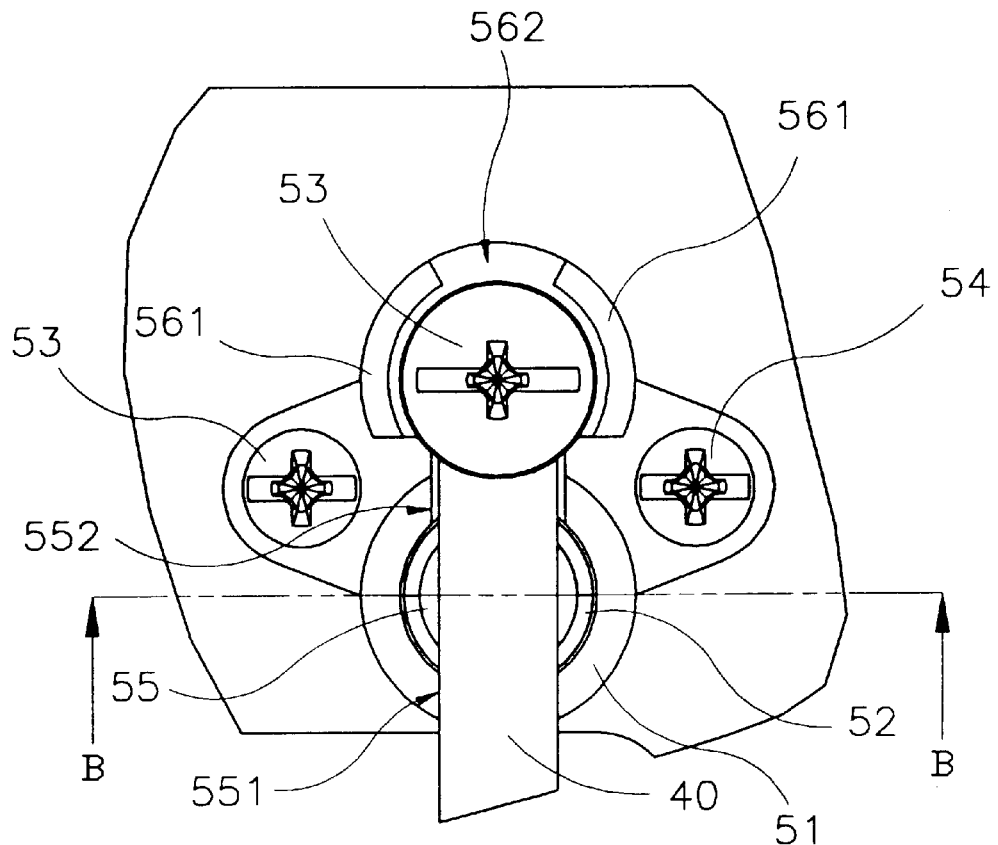
FIG. 6 is a partial plan view of the assembly of the guiding rod and the guiding rod support.
Figure 7:
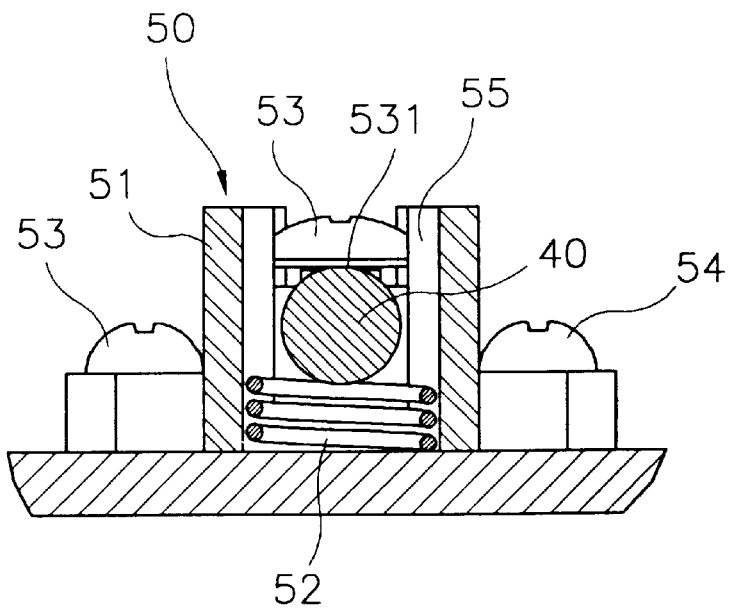
FIG. 7 is a sectional view, taken along line B—B of FIG. 6.

Referring to FIGS. 6 and 7, after mounting the second guiding rod 40 in the support 50, the horizontal position of the second guiding rod 40 is fixed by the front opening 551. The lower surface 531 of the screw 53 holds the end of the second guiding rod 40 from above, while the spring 52 presses thereon from below. So the vertical position of the second guiding rod 40 is determined by adjusting the adjustment screw 53. Once an optimum position of the adjustment screw 53 has been found, glue is inlet through the opening 562 into the grooves 571 of the hole 57 to fix the optimum position.

The embodiment of the present invention described above uses three height-adjustable supports 50, 60, 70. The assembly and working principle of the supports 60, 70 is the same as of the support 50. One end of the first guiding rod 30 is held by the fixed support 80, the height of which is not adjustable and serves as a reference height. The supports 50, 60, 70 are adjusted in a way that the first and second rods 30, 40 lie in a single plane, which is oriented to ensure the desired angle of incidence of the laser beam on the disc.

Alternatively, no fixed support 80 is used, but the first guiding rod 30 is held by two height adjustable supports 70.

Figure 8:
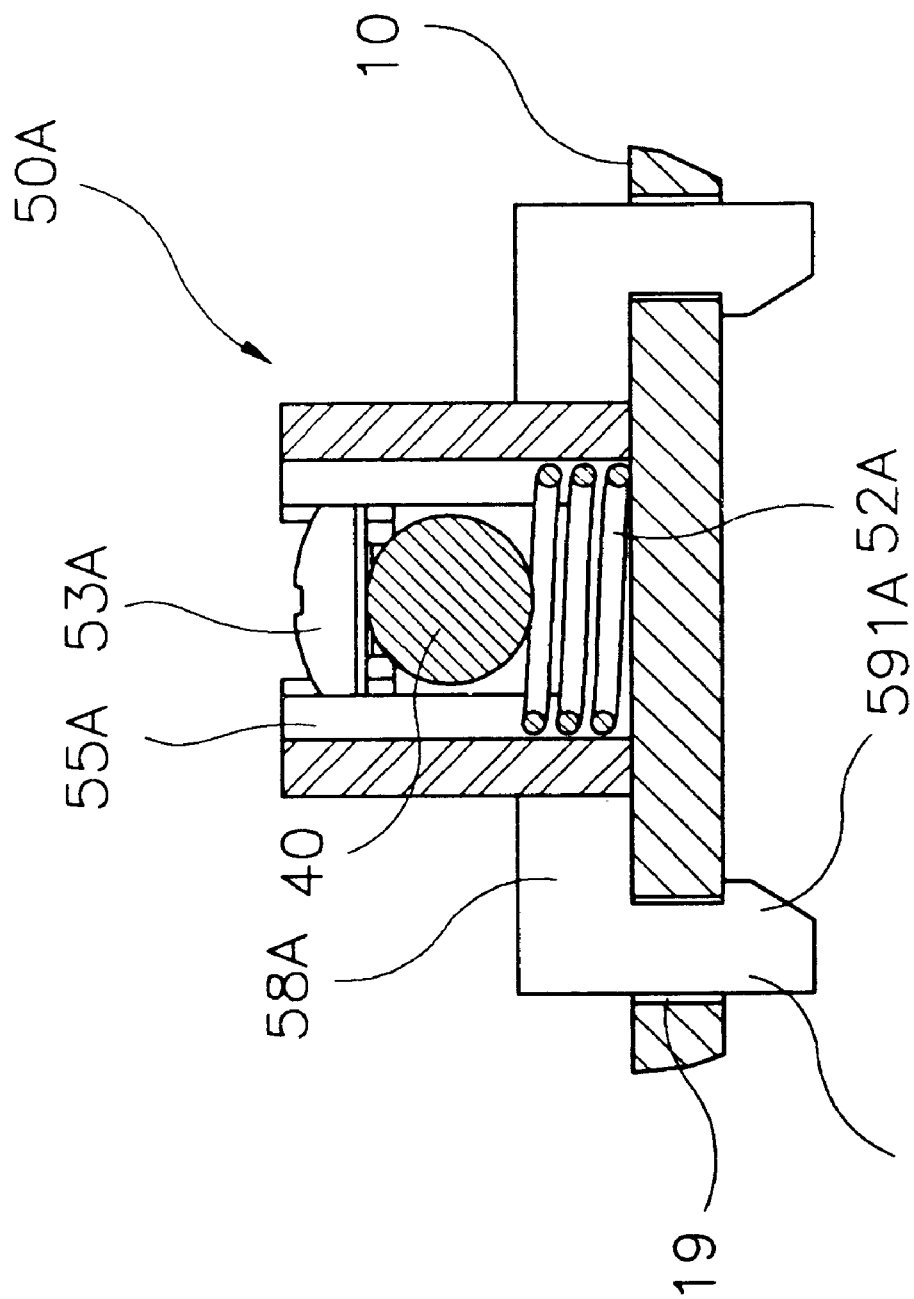
FIG. 8 is a sectional view of the guiding rod support of the present invention in the second embodiment.
Figure 10:
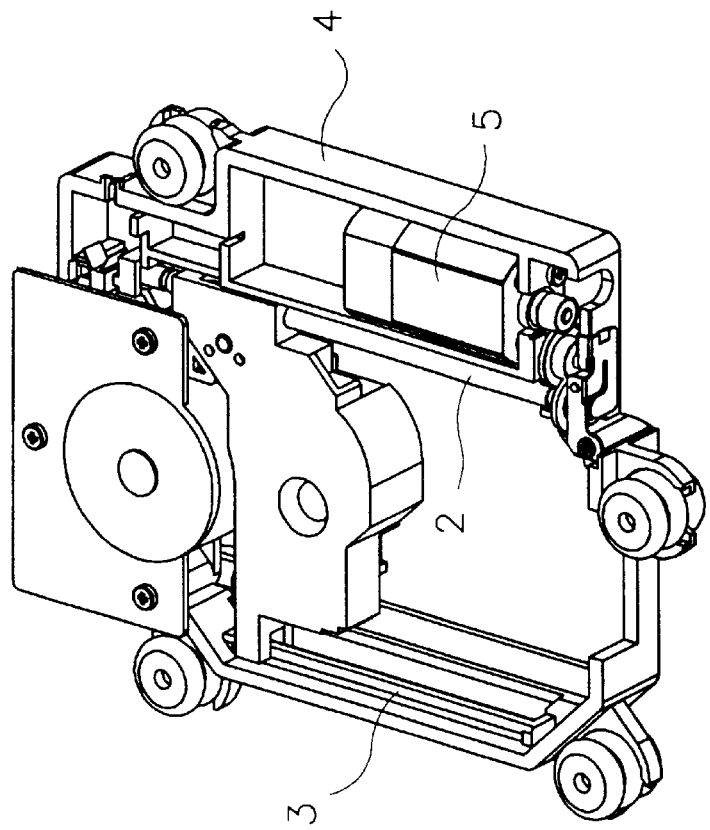
FIG. 10 is a perspective view of a conventional optical reading device, as seen from behind.
Figure 9:
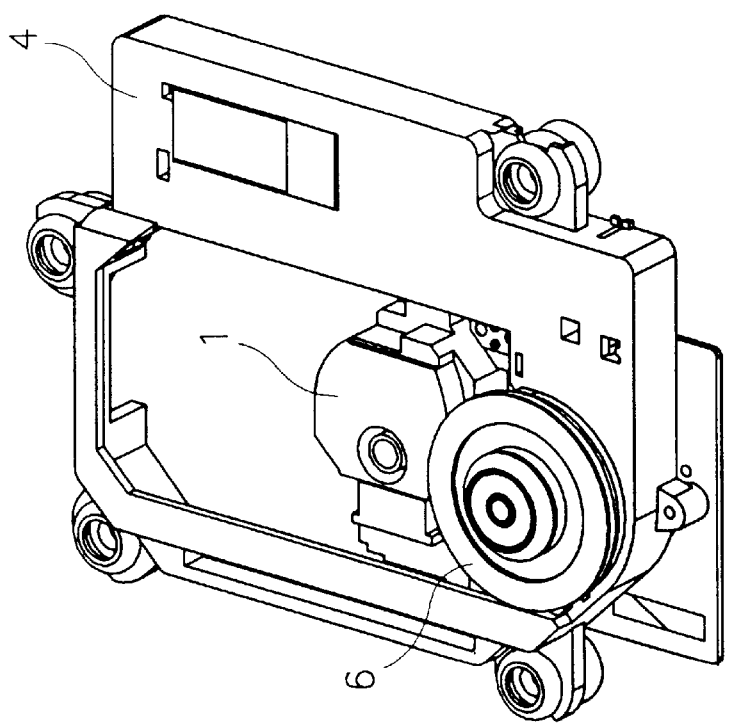
FIG. 9 is a perspective view of a conventional optical reading device.
Figure 12:
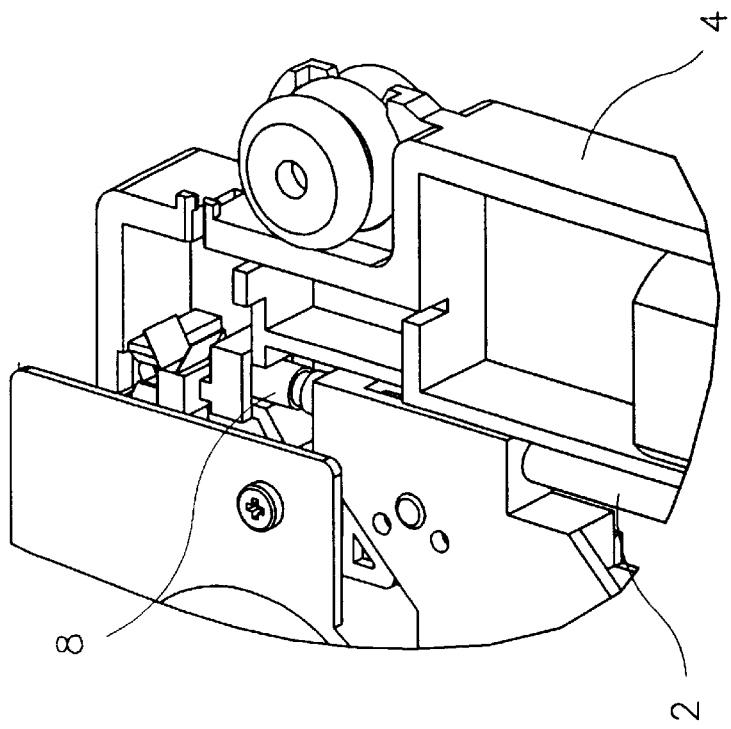
FIGS. 11 and 12 are partial perspective views of the accommodating parts for both ends of the guiding rod of a conventional optical reading device.
Figure 11:
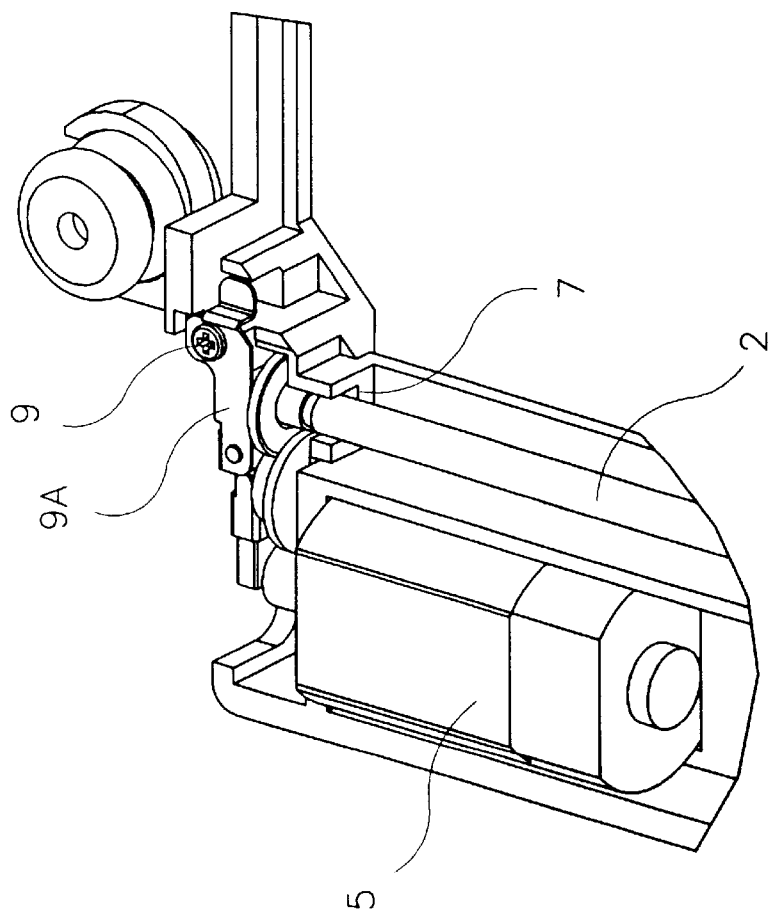

The present invention has further embodiments, as to fixing the supports 50, 60, 70 on the base 10. As shown in FIG. 8, the present invention in a second embodiment has a support 50A with base parts 58A on two opposite sides. Each base part 58A has a downward bent far end with a blocking part 59A. The far ends of the base parts 58A pass through holding holes 19 in the base 10. Noses 591A on the blocking parts 59A keep the far ends of the base parts 58A in the holding holes 19.

In further embodiments of the present invention, the supports 50, 60, 70 are integrated into the base 10, made of die-cast plastics, bent metal or die-cast metal. This saves holding screws and reduces the number of structural parts.

The most important achievement of the present invention is the adjustability of the height of the first and the second guiding rods. This compensates for inaccuracies in production and assembly of the disc recording/reproducing device, ensuring a proper angle of incidence of the laser beam on the disc. The present invention furthermore provides a method of adjustment that is easy to produce and cost-effective.

I claim:

1. An adjustment mechanism for use in a compact disc recording/reproducing device, which operates with a laser beam of a laser incident on a disc, for ensuring a proper tilt angle, said adjustment mechanism comprising:

a base;

a pick-up head, carrying said laser;

a first guiding rod and a second guiding rod with ends for guiding a movement of said pick-up head, said first and second guiding rods being parallel to each other and forming a plane with an orientation with respect to the disc that determines said tilt angle; and at least three supports, extending rom said base in a direction that is defined as upward, each of said supports holding a supported end, which is one of said ends of said first and second guiding rods and has a diameter, and comprising:

a main body, mounted on said base, having an accommodating space for accommodating said supported end, a spring, laid into said accommodating space of said main body pressing from below on said supported end, and an adjusting screw, mounted in a threaded vertical hole in said main body, leaning on said supported end from above, such that said supported end has a well-defined vertical position, which is adjusted by turning said adjusting screw;

wherein, by adjusting said at least three supports, said orientation of said plane is adjusted;

further wherein for each of said at least three supports, said hole has several longitudinal groove for taking in glue, so as to fix said adjusting screw in said hole.

2. An adjustment mechanism for use in a compact disc recording/reproducing device, which operates with a laser beam of a laser incident on a disc, for ensuring a proper tilt angle, said adjustment mechanism comprising:

a base;

a pick-up head, carrying said laser;

a first guiding rod and a second guiding rod with ends for guiding a movement of said pick-up head, said first and second guiding rods being parallel to each other and forming a plane with an orientation with respect to the disc that determines said tilt angle; and at least three supports, extending rom said base in a direction that is defined as upward, each of said supports holding a supported end, which is one of said ends of said first and second guiding rods and has a diameter, and comprising:

a main body, mounted on said base, having an accommodating space for accommodating said supported end, a spring, laid into said accommodating space of said main body pressing from below on said supported end, and an adjusting screw, mounted in a threaded vertical hole in said main body, leaning on said supported end from above, such that said supported end has a well-defined vertical position, which is adjusted by turning said adjusting screw;

wherein, by adjusting said at least three supports, said orientation of said plane is adjusted;

further wherein for each of said at least three supports, said main body has an opening with a width that is about equal to said diameter of said supported end for fixing said supported end horizontally.

\* \* \* \* \*